United States Patent

Gabato et al.

[11] Patent Number: 5,603,112
[45] Date of Patent: Feb. 11, 1997

[54] RECEIVED SIGNAL STRENGTH INDICATOR UTILIZING APPROXIMATION FACTORS AND THE I AND Q SIGNAL COMPONENTS

[75] Inventors: Manuel P. Gabato, Schaumburg; Mark A. Gannon, Carpentersville, both of Ill.

[73] Assignee: Motorola, Inc., Schaumburg, Ill.

[21] Appl. No.: 376,483

[22] Filed: Jan. 20, 1995

Related U.S. Application Data

[63] Continuation of Ser. No. 691,899, Apr. 26, 1991, abandoned.

[51] Int. Cl.$^6$ .................................................. H04B 17/00
[52] U.S. Cl. ...................... 455/226.2; 364/752; 364/730
[58] Field of Search .................. 455/226.2, 226.1, 455/304, 67.1, 303, 307; 364/487, 480, 451, 483, 752, 730, 736; 342/91

[56] References Cited

U.S. PATENT DOCUMENTS

| | | | |
|---|---|---|---|
| 3,858,036 | 12/1974 | Lunsford | 364/752 |
| 3,973,260 | 8/1976 | Gostantini | 342/91 |
| 4,298,942 | 11/1981 | Lee | 364/752 X |
| 4,549,311 | 10/1985 | McLaughlin | 455/277 |
| 4,599,701 | 7/1986 | Vojir et al. | 364/752 |
| 4,718,081 | 1/1988 | Brenig | 379/60 |
| 4,747,067 | 5/1988 | Jagodnik, Jr. et al. | 364/752 |
| 4,868,885 | 9/1989 | Perry | 455/226.2 |
| 5,151,866 | 9/1992 | Glasser et al. | 364/487 |
| 5,241,690 | 8/1993 | Larsson et al. | 455/226.2 |
| 5,243,537 | 9/1993 | Neumann | 364/483 |
| 5,287,556 | 2/1994 | Cahill | 455/307 X |

Primary Examiner—Reinhard J. Eisenzopf
Assistant Examiner—Philip J. Sobutka
Attorney, Agent, or Firm—Susan L. Lukasik

[57] ABSTRACT

Received signal strength calculations in a radio are carried out by hardware which scales the absolute value of components of the received signal in a linear fashion by using two scaling factors.

17 Claims, 2 Drawing Sheets

RECEIVED SIGNAL STRENGTH INDICATOR UTILIZING APPROXIMATION FACTORS AND THE I AND Q SIGNAL COMPONENTS

This is a continuation of application Ser. No. 07/691,899, filed Apr. 26, 1991 and now abandoned.

FIELD OF THE INVENTION

This invention relates to received signal strength indication (RSSI). More particularly, this invention relates to RSSI measurements in RF receivers.

BACKGROUND OF THE INVENTION

In communications receivers today, measurements/calculations of received signal strength indication (RSSI) are made for various reasons, including use in call hand-off and base station assignment in trunked radio systems. RSSI is the amplitude of the received signal, denoted by $|\vec{R}|$. As shown in FIG. 1, a received vector, $\vec{R}$, is mapped into the I-Q plane, where $\vec{R}=\vec{I}+\vec{Q}$. The received vector, $\vec{R}$, is separated from the I axis by the angle $\theta$. The I-Q plane is divided into four quadrants, I, II, III, and IV. By convention, RSSI is calculated using the equation $|\vec{R}|=\sqrt{|\vec{I}|^2+|\vec{Q}|^2}$ for absolute terms or $|\vec{R}|=10\log(|\vec{I}|^2+|\vec{Q}|^2)$ for a measurement in dB (decibels). Such calculations could be done using the block diagram shown in FIG. 2. $\vec{I}$ is fed into a squaring function block 201, and $\vec{Q}$ is fed into a squaring function block 203. The output of each of the squaring function blocks 201 and 203 is added by an adder 205. The output of the adder is fed into a 10 log (base 10 is assumed unless otherwise noted) function block 207, which outputs RSSI in dB, and a square-root function block 209, which outputs RSSI in absolute terms. However, implementation of such circuitry is very complex and costly in terms of real estate occupied by the circuitry. In a digital hardware implementation, the squaring function alone takes up an entire ROM or a digital multiplier. A second ROM is required to calculate the square-root (or 10 log) function. This additional hardware also causes a significant amount of current drain from the battery.

Accordingly, a less complex method of computing RSSI is required.

DESCRIPTION OF A PREFERRED EMBODIMENT

The following describes a method and apparatus for a less complex RSSI calculation. In the preferred embodiment, the RSSI measurement is obtained by taking $|\vec{R}|=\sqrt{|\vec{I}|^2+|\vec{Q}|^2} \approx c_1|\vec{I}|+c_2|\vec{Q}|$, where $c_1$ and $c_2$ are constant scale factors that minimize the error between the two expressions.

Figure 1:
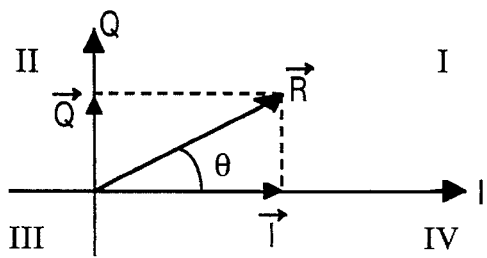
FIG. 1 is a diagram of a received signal vector.
Figure 2:
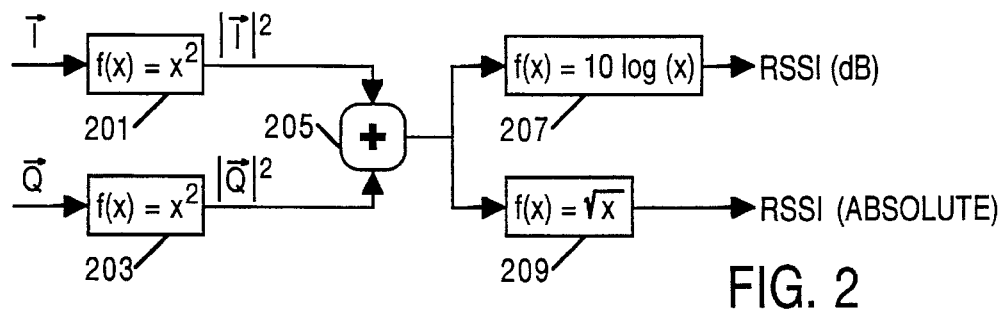
FIG. 2 is a block diagram showing RSSI calculations as may conventionally be performed.

As the equation denotes, $|\vec{I}|$ and $|\vec{Q}|$ map $\vec{R}$ into quadrant I, as shown in FIG. 1. The desired function relates $|\vec{R}|$ to $|\vec{I}|$ and $|\vec{Q}|$ in a linear fashion. Let $|\vec{R}|=c_1|\vec{I}|+c_2|\vec{Q}|$ for $0°\leq\theta\leq45°$, and let $|\vec{R}|=c_1|\vec{Q}|+c_2|\vec{I}|$ for $45°<\theta\leq90°$. Let $|\vec{R}|=1$, $|\vec{I}|\equiv\cos\theta$, and $|\vec{Q}|\equiv\sin\theta$. The error function, $E=|\vec{R}-(c_1|\vec{I}|+c_2|\vec{Q}|)|=1-c_1\cos\theta-c_2\sin\theta$, and further $E^2=(1-c_1\cos\theta-c_2\sin\theta)^2$. The values $c_1$ and $c_2$ must be found such that $E^2$ is minimized for $0°\leq\theta\leq45°$, i.e. minimize $$\frac{4}{\pi}\int_0^{\frac{\pi}{4}} E^2(\theta)d\theta, \text{ or } \frac{d}{dc_1}\left\{\frac{4}{p}\int_0^{\frac{p}{4}} E^2(q)dq\right\} =$$

$$0 \text{ and } \frac{d}{dc_2}\left\{\frac{4}{\pi}\int_0^{\frac{\pi}{4}} E^2(\theta)d\theta\right\} = 0$$

to minimize the error for $c_1$ and $c_2$.

In order to solve these equations, substitute $(1-c_1\cos\theta-c_2\sin\theta)^2$ for $E^2(\theta)$, take the derivatives, and divide both sides of the equation by $4/\pi$. This yields the equations $$\int_0^{\frac{\pi}{4}} (1-c_1\cos\theta-c_2\sin\theta)(-\cos\theta)d\theta = 0 \quad \text{(EQ. 1)}$$

$$\int_0^{\frac{\pi}{4}} (1-c_1\cos\theta-c_2\sin\theta)(-\sin\theta)d\theta = 0. \quad \text{(EQ. 2)}$$

Evaluating the integrals in EQ. 1 and EQ. 2 over the radian interval $0\leq\theta\leq\pi/4$ (which is $0°\leq\theta\leq45°$) yields $c_1=-0.3890c_2+1.1002$, from EQ. 1, and $c_2=-1.7519c_1+2.0526$, from EQ. 2. Solving these two equations in $c_1$ and $c_2$ simultaneously yields $c_1=0.9473$ and $c_2=0.3929$. Thus, the desired functions become:

$|\vec{R}|=0.9473|\vec{I}|+0.3929|\vec{Q}|$ for $0°\leq\theta\leq45°$, or $|\vec{I}|\geq|\vec{Q}|$ and $|\vec{R}|=0.9473|\vec{Q}|+0.3929|\vec{I}|$ for $45°<\theta\leq90°$, or $|\vec{Q}|>|\vec{I}|$.

Figure 3:
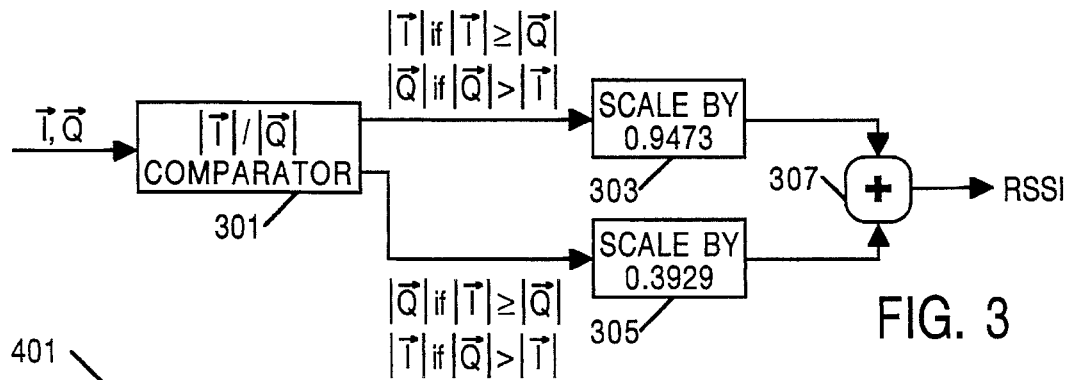
FIG. 3 is a block diagram of a circuit which performs RSSI calculations in accordance with the invention.

FIG. 3 is a block diagram of a circuit which performs RSSI calculations using the simplified equations derived above. $\vec{I}$ and $\vec{Q}$ are fed into an $|\vec{I}|/|\vec{Q}|$ comparator 301, which takes magnitudes of $\vec{I}$ and $\vec{Q}$ and compares the magnitudes. If $|\vec{I}|\geq|\vec{Q}|$, $|\vec{I}|$ is fed to a scale by 0.9473 block 303 and $|\vec{Q}|$ is fed to a scale by 0.3929 block 305. If $|\vec{Q}|>|\vec{I}|$, $|\vec{Q}|$ to by 0.9473 block 303 $|\vec{I}|$ fed to a scale by 0.3929 block 305. The outputs of the scaling blocks 303 and 305 are added by an adder 307, which outputs RSSI in absolute terms. Absolute RSSI values may be fed into a function block which calculates $f(x)=20\log(x)$ to obtain values in dB. The maximum error calculated using the method described for FIG. 3 is 0.47 dB. To simplify the approximation $|\vec{R}|\approx c_1|\vec{I}|+c_2|\vec{Q}|$ further, take $|\vec{R}|\approx\alpha\{|\vec{I}|+|\vec{Q}|\}$. Taking $\alpha=1/\sqrt[4]{2}$ to minimize the error, the maximum error is 1.5 dB. In the simplest calculation, when RSSI is taken as $|\vec{R}|=|\vec{I}|+|\vec{Q}|$, the maximum error is 3 dB.

Figure 4:
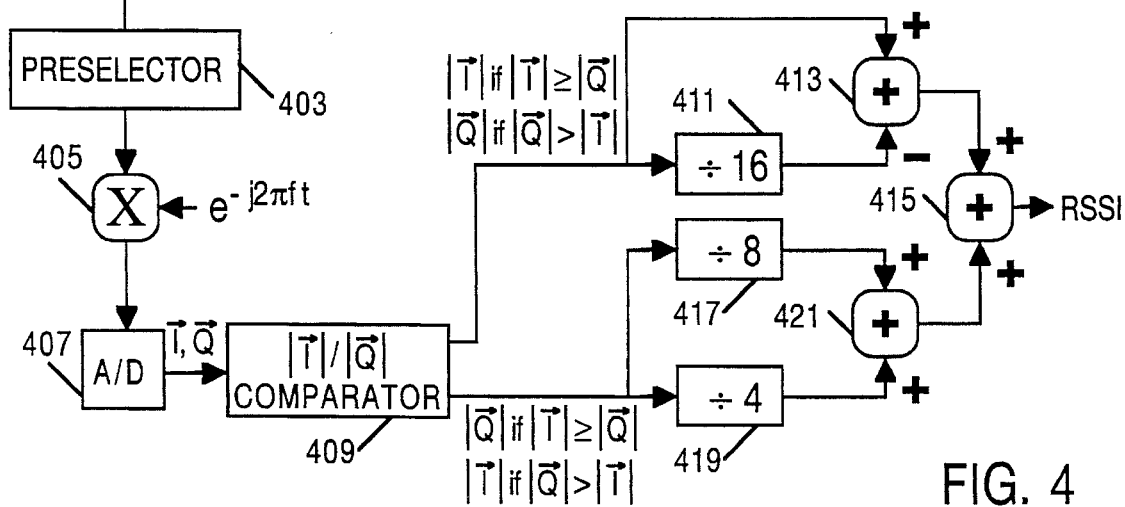
FIG. 4 is a block diagram of a radio receiver with simplified RSSI calculations in accordance with the invention.

Close estimation of the scaling factors yields further simplification of the needed circuitry. By approximating $c_1=0.9473$ as $1\frac{1}{16}=0.9375$ and $c_2=0.3929$ as $\frac{1}{8}+\frac{1}{4}=0.3750$, the calculations are simplified greatly. When using digital hardware to calculate $\frac{1}{16}$, the binary value entered is shifted 4 bits to the right. To calculate $\frac{1}{8}$, the binary value entered is shifted 3 bits to the right. To calculate $\frac{1}{4}$, the binary value entered is shifted 2 bits to the right. Shifting and adding functions are highly efficient functions in digital hardware. A block diagram of a radio receiver with simplified RSSI calculations is shown in FIG. 4. An antenna 401 and a preselector 403 receive and process the incoming signal which is then mixed with signal $e^{-j2\pi ft}$ in a quadrature mixer 405 (downconversion), which produces the $\vec{I}$ and $\vec{Q}$ components. Each $\vec{I}$ and $\vec{Q}$ component is converted individually to a multi-bit digital signal by an A/D converter 407. In the preferred embodiment, these are 16-bit signals. A digital IF filter is optional after the A/D converter 407. $\vec{I}$ and $\vec{Q}$ are output from the A/D converter 407 to an $|\vec{I}|/|\vec{Q}|$ comparator 409, which takes magnitudes of $\vec{I}$ and $\vec{Q}$ and compares the magnitudes. If $|\vec{I}|\geq|\vec{Q}|$, $|\vec{I}|$ is fed to a divide-by-16 block 411 and adder 413, and $|\vec{Q}|$ is fed to a divide-by-8 block 417 and a divide-by-4 block 419. If $|\vec{Q}|>|\vec{I}|$, $|\vec{Q}|$ is fed to divide-by-16 block 411 and adder 413, and $|\vec{I}|$ is fed to a divide-by-8 block 417 and a divide-by-4 block 419. The output of the divide-by-16 block 411 is subtracted by adder 413 from the value input to adder 413 by the $|\vec{I}|/|\vec{Q}|$ comparator 409, and the result is fed to adder 4 15. The output of the divide-by-8 block 417 and the output of the divide-by-4 block 419 are added together by adder 421, the result of which is input to adder 415. Adder 415 outputs RSSI in absolute terms. Absolute RSSI values may be fed into a function block which calculates $f(x)=20 \log(x)$ to obtain values in dB. The maximum error calculated using the method described for FIG. 3 is 0.65 dB.

Figure 5:
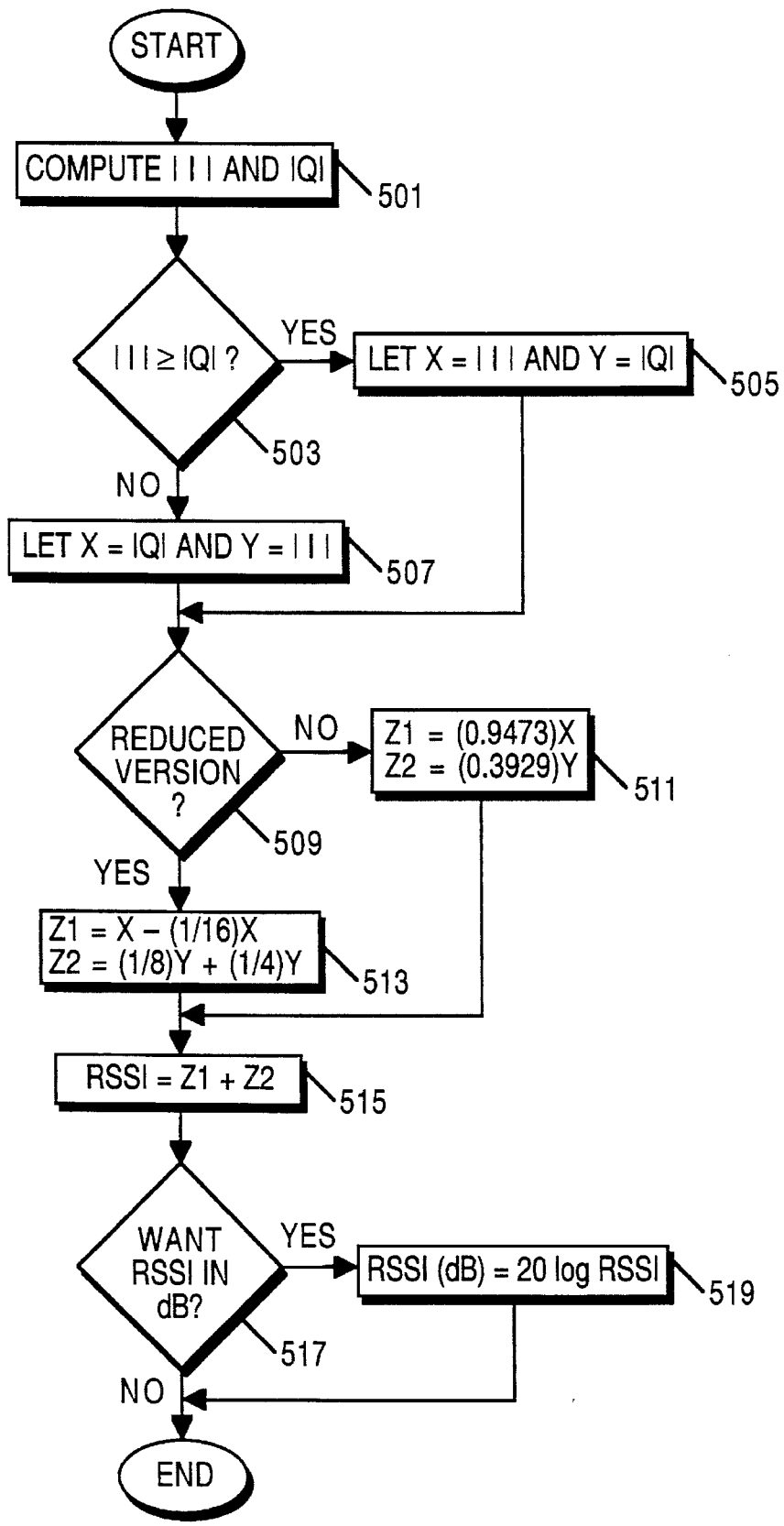
FIG. 5 is a flowchart showing RSSI calculations in accordance with the invention.

FIG. 5 is a flowchart showing RSSI calculations, as performed by conventional digital hardware in the preferred embodiment. At step 501, $|\vec{I}|$ and $|\vec{Q}|$ are computed. If at step 503, If $|\vec{I}|\geq|\vec{Q}|$, then $X=|\vec{I}|$ and $Y=|\vec{Q}|$ at step 505. If at step 503, $|\vec{Q}|>|\vec{I}|$, then $X=|\vec{Q}|$ and $Y=|\vec{I}|$ at step 507. If at step 509, the unreduced version calculation is implemented, as shown in blocks 301, 303, 305, and 307 of FIG. 3, then at step 511 $Z1=(0.9473)X$ and $Z2=(0.3929)Y$. If at step 509, the reduced version calculation is implemented as shown in blocks 409, 411, 413, 415, 417, 419, and 421 of FIG. 3, then at step 513 $Z1=X-(\frac{1}{16})X$, where the multiply by $\frac{1}{16}$ function is implemented by shifting 4 bits to the right, and $Z2=(\frac{1}{8})Y+(\frac{1}{4})Y$, where the multiply by $\frac{1}{8}$ function is implemented by shifting 3 bits to the right and the multiply by $\frac{1}{4}$ function is implemented by shifting 2 bits to the right. At step 515, RSSI is calculated by adding Z1 and Z2. If at step 517, it is desired to have RSSI in dB, then at step 519 RSSI(dB) equals 20 log RSSI, using RSSI as calculated in step 515, and the process ends.

Although the implementation of the preferred embodiment utilizes conventional digital hardware, it will be readily appreciated that other successful implementations are possible, such as in a standard cell ASIC (Application Specific Integrated Circuit), as is available from Motorola, Inc., or by way of a microprocessor or DSP (Digital Signal Processor) controlled by appropriate software, or, perhaps in a programmable logic array. Other implementations may well come to mind.

What is claimed is:

1. A method comprising the steps of:

receiving a signal having a magnitude;

demodulating the signal, producing therefrom a first signal component and a second signal component;

computing the magnitude of the first signal component and the second signal component;

when the magnitude of the first signal component is greater than or equal to the magnitude of the second signal component, scaling the first signal component by a first factor, thereby yielding a first scaled component, and scaling the second signal component by a second factor, thereby yielding a second scaled component;

when the magnitude of the second signal component is greater than the magnitude of the first signal component, scaling the first signal component by the second factor, thereby yielding the first scaled component, and scaling the second signal component by the first factor, thereby yielding the second scaled component;

adding the first scaled component to the second scaled component, the result yielding a received signal strength indication, wherein the first factor is 0.9473 or 0.9375 and the second factor is 0.3929 or 0.3750.

2. The method of claim 1, further comprising the step of calculating 20 log of the received signal strength indication so as to yield a received signal strength indication in dB.

3. The method of claim 1, wherein the first signal component is an in-phase component of the received signal and the second signal component is a quadrature component of the received signal.

4. The method of claim 1, wherein the receiving step is performed by a radio frequency receiver.

5. The method of claim 1, wherein the first factor and the second factor are chosen such that hardware implementation of the method is simplified.

6. An apparatus comprising:

a demodulator, arranged and constructed to receive a signal having a magnitude and produce therefrom a first signal and a second signal;

a comparator, which receives the first signal and the second signal from the demodulator, the comparator arranged and constructed to output a) the magnitude of the first signal on a first output of the comparator and the magnitude of the second signal on a second output of the comparator when the magnitude of the first signal is greater than or equal to the magnitude of the second signal; and b) the magnitude of the second signal on a first output and the magnitude of the first signal on the second output when the magnitude of the second signal is greater than the magnitude of the first signal;

a first scaler, operatively coupled to the first output of the comparator, the first scaler arranged and constructed to scale the signal on the first output of the comparator by a first factor and output the result on a first scaler output;

a second scaler, operatively coupled to the second output of the comparator, the second scaler arranged and constructed to scale the signal on the second output of the comparator by a second factor and output the result on a second scaler output;

an adder, operatively coupled to the first scaler output and the second scaler output, the adder arranged and constructed to add the signals on the first scaler output and the second scaler output and output the result as a received signal strength indication, wherein the first scaler is arranged and constructed to scale the signal on the first output of the comparator by the factor 0.9375 or the factor 0.9473, and wherein the second scaler is arranged and constructed to scale the signal on the second output of the comparator by the factor 0.3750 or the factor 0.3929.

7. The apparatus of claim 6, further comprising a block, arranged and constructed to calculate 20 log of the received signal strength indication so as to yield a received signal strength indication in dB.

8. The apparatus of claim 6, wherein the first signal represents an in-phase component of a received analog signal and the second signal represents a quadrature component of the received analog signal.

9. The apparatus of claim 6, further comprising a radio frequency receiver, constructed and arranged to receive a radio frequency signal.

10. The apparatus of claim 6, wherein the comparator, the first scaler, the second scaler, and the adder are disposed in a radio transceiver.

11. The method of claim 6, wherein the first factor and the second factor minimize root mean square error between the result and the magnitude of the received signal.

12. An apparatus comprising:

a demodulator, arranged and constructed to receive a signal and produce therefrom signals $\vec{I}$ and $\vec{Q}$;

a comparator, which receives the signals $\vec{I}$ and $\vec{Q}$ from the demodulator, the comparator arranged and constructed to output the signals $|\vec{I}|$ on a first output and $|\vec{Q}|$ on a second output when $|\vec{I}| \geq |\vec{Q}|$; and $|\vec{Q}|$ on the first output and $|\vec{I}|$ on the second output when $|\vec{Q}| > |\vec{I}|$;

a first divider, operatively coupled to the first output of the comparator, the first divider arranged and constructed to divide the signal on the first output of the comparator by 16 and outputs the result on a first divider output;

a second divider, operatively coupled to the second output of the comparator, the second divider arranged and constructed to divide the signal on the second output of the comparator by 8 and outputs the result on a second divider output;

a third divider, operatively coupled to the second output of the comparator, that divides the signal on the second output of the comparator by 4 and outputs the result on a third divider output;

a first adder, operatively coupled to the first output of the comparator and the first divider output, the first adder arranged and constructed to add the signal on the first output of the comparator and a negative one times the signal on the first divider output and output the result on a first adder output;

a second adder, operatively coupled to the second divider output and the third divider output, the second adder arranged and constructed to add the signals on the second divider output and the third divider output and output the result on a second adder output;

a third adder, operatively coupled to the first adder output and the second adder output, the third adder arranged and constructed to add the signals on the first adder output and the second adder output and output the result as a received signal strength indication.

13. The apparatus of claim 12, further comprising a block, arranged and constructed to calculate 20 log of the received signal strength indication so as to yield a received signal strength indication in dB.

14. The apparatus of claim 12, wherein the demodulator further comprises an analog to digital converter, arranged and constructed to convert a received analog signal into a digital signal comprised of the signals $\vec{I}$ and $\vec{Q}$.

15. The apparatus of claim 12, further comprising a radio frequency receiver, constructed and arranged to receive a radio frequency signal.

16. The apparatus of claim 12, wherein the comparator, the first divider, the second divider, the third divider, the first adder, the second adder, and the third adder are disposed in a radio transceiver.

17. A method comprising the steps of:

demodulating a signal, producing therefrom signals $\vec{I}$ and $\vec{Q}$;

comparing the signals $\vec{I}$ and $\vec{Q}$;

when $|\vec{I}| \geq |\vec{Q}|$, selecting $|\vec{I}|$ as a first output signal and $|\vec{Q}|$ as a second output signal;

when $|\vec{Q}| > |\vec{I}|$, selecting $|\vec{Q}|$ as the first output signal and $|\vec{I}|$ as the second output signal;

dividing the first output signal by 16, yielding a first divider signal;

dividing the second output signal by 8, yielding a second divider signal;

dividing the second output signal by 4, yielding a third divider signal;

adding the first output signal and a negative one times the first divider signal, yielding a first adder signal;

adding the second divider signal and the third divider signal, yielding output a second adder signal;

adding the first adder signal and the second adder signal, yielding a received signal strength indication of the signal.

* * * * *

UNITED STATES PATENT AND TRADEMARK OFFICE
CERTIFICATE OF CORRECTION

PATENT NO. : 5,603,112
DATED : February 11, 1997
INVENTOR(S) : Manuel P. Gabato et al.

It is certified that error appears in the above-indentified patent and that said Letters Patent is hereby corrected as shown below:

Col. 5, line 35, claim 12 "$|\vec{I}| \geqq |\vec{Q}|$" should be -- $|\vec{I}| \geq |\vec{Q}|$ --.

Col. 6, line 35, claim 17 "$|\vec{I}| \geqq |\vec{Q}|$" should be -- $|\vec{I}| \geq |\vec{Q}|$ --.

Signed and Sealed this

Twenty-sixth Day of August, 1997

Attest:

BRUCE LEHMAN

*Attesting Officer*  *Commissioner of Patents and Trademarks*